(12) United States Patent
Davis et al.

(10) Patent No.: US 9,163,339 B2
(45) Date of Patent: Oct. 20, 2015

(54) METHOD OF MANUFACTURING A COMPOSITE ARTICLE USING FIBERS HAVING OPTIMIZED SHAPES FOR IMPROVED OPTICAL PERFORMANCE

(71) Applicant: The Boeing Company, Chicago, IL (US)

(72) Inventors: Keith J. Davis, Seattle, WA (US); Michael P. Kozar, Mercer Island, WA (US); Mark S. Wilenski, Mercer Island, WA (US)

(73) Assignee: The Boeing Company, Chicago, IL (US)

( * ) Notice: Subject to any disclaimer, the term of this patent is extended or adjusted under 35 U.S.C. 154(b) by 143 days.

(21) Appl. No.: 14/038,569

(22) Filed: Sep. 26, 2013

(65) Prior Publication Data

US 2014/0087172 A1    Mar. 27, 2014

Related U.S. Application Data

(62) Division of application No. 12/968,557, filed on Dec. 15, 2010, now Pat. No. 8,568,854.

(51) Int. Cl.
*D02G 3/22* (2006.01)
*B29C 65/18* (2006.01)
*B29C 65/00* (2006.01)
(Continued)

(52) U.S. Cl.
CPC  *D02G 3/22* (2013.01); *B29C 65/18* (2013.01); *B29C 66/1142* (2013.01); *B29C 70/10* (2013.01); *B32B 3/18* (2013.01); *B29K 2995/0026* (2013.01); *Y10T 156/10* (2015.01); *Y10T 156/1002* (2015.01);
(Continued)

(58) Field of Classification Search
CPC ............................ B29C 65/18; B29C 66/1142
USPC ...................................................... 156/308.2
See application file for complete search history.

(56) References Cited

U.S. PATENT DOCUMENTS

| | | |
|---|---|---|
| 4,461,855 A | 7/1984 | Phillips |
| 5,039,566 A | 8/1991 | Skubic |

(Continued)

FOREIGN PATENT DOCUMENTS

| | | | |
|---|---|---|---|
| GB | 2084977 | 4/1982 | |
| GB | 2084977 A * | 4/1982 | ............... D01F 9/08 |

(Continued)

OTHER PUBLICATIONS

International Search Report, PCT/US2011/060111, dated Mar. 30, 2012.

(Continued)

*Primary Examiner* — Brent O'Hern

(57) ABSTRACT

A method of manufacturing a composite article may include providing a plurality of fibers. At least a portion of the plurality of fibers may be substantially optically transparent. The method may further include forming the fibers with at least one base surface and a pair of side surfaces oriented in non-perpendicular relation to the base surface. The method may additionally include positioning the fibers in a layer in side-by-side relation to one another such that the side surfaces overlap one another when viewed along a direction normal to a plane of the layer. The method may also include embedding the fibers at least partially in a substantially optically transparent polymeric matrix.

15 Claims, 8 Drawing Sheets

(51) Int. Cl.
*B29C 70/10* (2006.01)
*B32B 3/18* (2006.01)

(52) U.S. Cl.
CPC . *Y10T 428/24058* (2015.01); *Y10T 428/24124* (2015.01); *Y10T 428/249942* (2015.04)

(56) References Cited

U.S. PATENT DOCUMENTS

| | | | |
|---|---|---|---|
| 5,665,450 | A | 9/1997 | Day et al. |
| 2004/0062903 | A1 | 4/2004 | Miller |
| 2004/0062934 | A1 | 4/2004 | Miller |
| 2008/0241537 | A1 | 10/2008 | Sennett |
| 2010/0136284 | A1 | 6/2010 | Harazono |
| 2012/0088063 | A1 | 4/2012 | Kozar |

FOREIGN PATENT DOCUMENTS

| | | |
|---|---|---|
| JP | S5742927 | 3/1982 |
| JP | S62131034 | 6/1987 |
| JP | 2008545151 A | 12/2008 |
| WO | WO2006121706 A | 11/2006 |
| WO | WO2008120619 | 10/2008 |

OTHER PUBLICATIONS

European Search Report, EP14181267, dated Nov. 27, 2014.
Japanese Office Action, 2013-544486, dated Aug. 11, 2015.
Chinese Office Action, 201180060409.7, dated Aug. 5, 2015.

\* cited by examiner

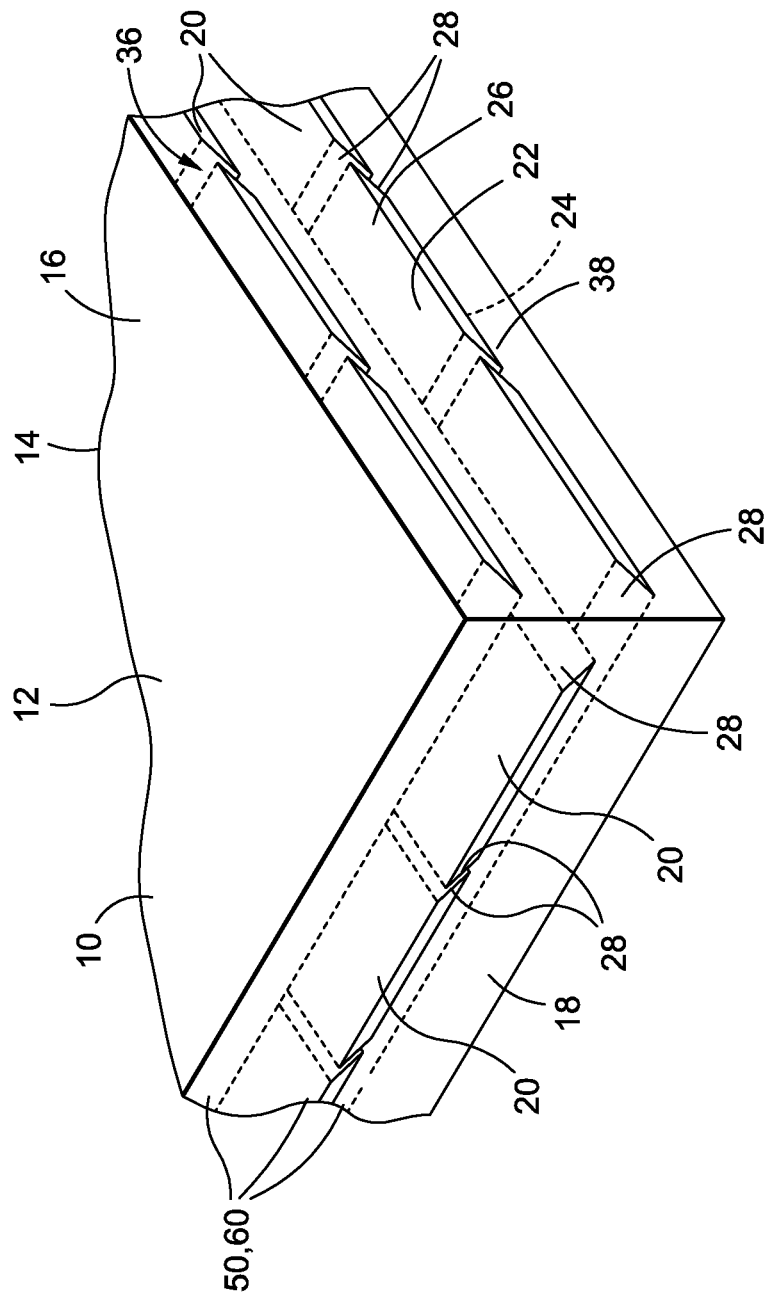

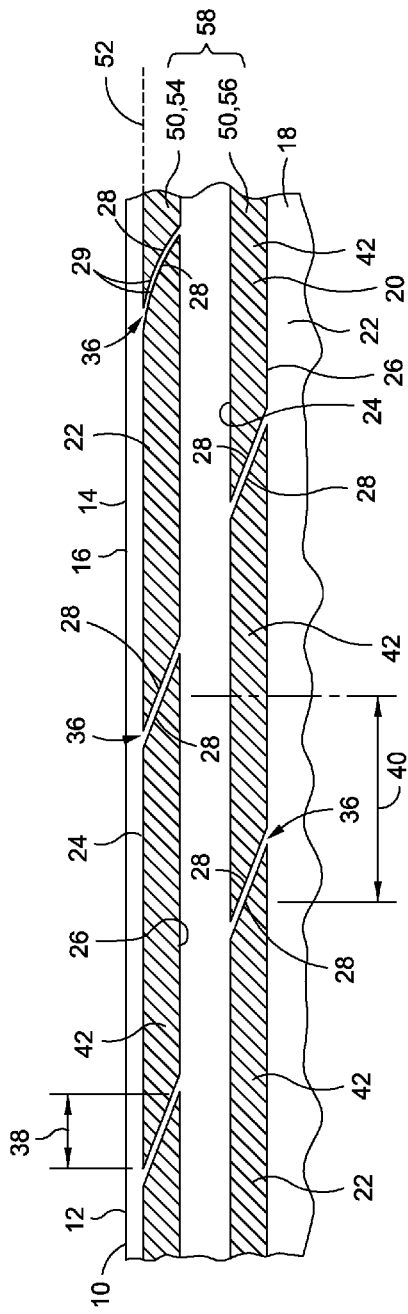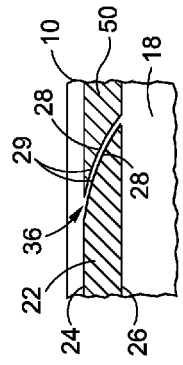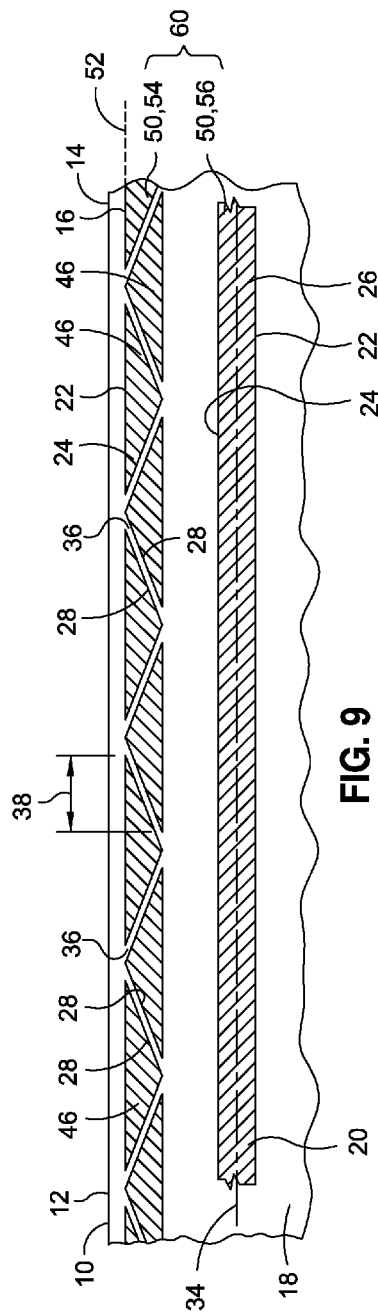

METHOD OF MANUFACTURING A COMPOSITE ARTICLE USING FIBERS HAVING OPTIMIZED SHAPES FOR IMPROVED OPTICAL PERFORMANCE

CROSS-REFERENCE TO RELATED APPLICATIONS

This application is a divisional application of and claims priority to application Ser. No. 12/968,557 entitled OPTIMIZED FIBER SHAPES FOR IMPROVED OPTICAL PERFORMANCE and filed on Dec. 15, 2010, now U.S. Pat. No. 8,568,854, the entire contents of which is expressly incorporated by reference herein.

FIELD

The present disclosure relates generally to composites and, more particularly, to fiber reinforced composite articles having improved optical performance.

BACKGROUND

Glass is widely used as a transparency in a variety of applications due to its superior optical qualities. For example, glass is commonly used as a glazing material or as an architectural material for buildings. Glass is also commonly used as a transparency in vehicular applications. Unfortunately, glass is a relatively dense material and is also relatively brittle such that relatively large thicknesses are required to provide sufficient strength for resisting shattering when the glass is impacted by an object such as a projectile.

In attempts to avoid the weight penalty associated with glass, transparencies may be fabricated from polymeric materials. For example, transparencies may be formed of optically transparent monolithic polymers such as acrylic which is less dense than glass and which possesses suitable optical properties. Unfortunately, acrylic is a relatively low strength material making it generally unsuitable for many applications where high impact resistance is required.

In consideration of the weight penalties associated with glass and the strength limitations of monolithic polymers, manufacturers have also fabricated transparencies from polymeric materials reinforced with glass fibers. The glass fibers may be embedded within an organic and/or polymeric matrix to provide improved strength and impact resistance. Unfortunately, the addition of glass fibers to the polymeric matrix may undesirably affect the optical quality of the transparency. For example, the glass fibers may have a cylindrical configuration causing each glass fiber to act as a small lens. The cumulative effect of the plurality of glass fibers is a scattering of light as the light passes through the transparency such that objects viewed through the transparency may appear blurred.

In attempts to avoid the scattering of light caused by cylindrically-shaped glass fibers, manufacturers may fabricate the fibers in a ribbon shape having an elongated cross-section with generally planar upper and lower surfaces. In a given layer, such fibers are typically spaced apart from one another resulting in some of the incident light passing between the fibers without going through the fibers. When there is a mismatch in the refractive index of the materials, there is a deleterious effect on the optics of the transparency due to the more rapid phase advance of a light wave of the incident light when the wave front passes through the material having a higher refractive index. The consequence of the incident plane wave of light is that the wave front will become distorted and lead to optical scatter and blurring when an image is formed. The cumulative effect in a multi-layer composite panel is that an incident wave front will become progressively more distorted as the wave front passes through an increasing number of layers of the transparency. The greater the quantity of layers in the transparency, the greater the amount of optical distortion in the wave front resulting in greater optical scatter and blurring.

A further drawback associated with flat or ribbon-shaped fibers is that the side surfaces of the fibers may be rounded. Unfortunately, the rounded side surfaces result in unwanted refractive wave steering of the light which causes significant optical distortion when the refractive index of the fiber is different than the refractive index of the matrix. Manufacturers may also fabricate the fibers with squared-off side surfaces oriented generally perpendicular to the planar upper and lower surfaces. Unfortunately, when the side surfaces are viewed off angle, differences in refractive index of the fibers and matrix will result in optical distortion due to refractive and diffractive effects.

Although the fibers and the matrix may be selected to have generally matched refractive indices at a given temperature, changes in temperature of the composite article may result in differences in refractive index if the fibers and matrix have different temperature coefficients of refractive index. Furthermore, the refractive index of the fibers and matrix may differ as a result of residual stresses that may be induced in the fibers or matrix during manufacturing.

As can be seen, there exists a need in the art for a transparent composite article having a fiber configuration that provides improved optical performance over a wide temperature range despite difference in refractive index of the fibers and the matrix.

BRIEF SUMMARY

The above-described needs associated with transparent composite articles are specifically addressed and alleviated by the present disclosure which, in an embodiment, provides a composite article having an article surface and which includes a plurality of fibers at least partially embedded in a matrix. Each fiber may have at least one base surface and a pair of side surfaces oriented in non-perpendicular relation to the base surface. The fibers may be positioned in side-by-side relation to one another.

Also disclosed is a method of manufacturing a composite article including the steps of providing a plurality of fibers and forming the fibers with at least one base surface and a pair of side surfaces oriented in non-perpendicular relation to the base surface. The method may further include positioning the fibers such that the side surfaces overlap one another when viewed along a direction normal to a plane of the layer.

In a further embodiment, disclosed is a fiber which may include at least one base surface and a pair of side surfaces oriented in non-perpendicular relation to the base surface. The fiber may be embedded in a matrix.

The features, functions and advantages that have been discussed can be achieved independently in various embodiments of the present disclosure or may be combined in yet other embodiments, further details of which can be seen with reference to the following description and drawings below.

BRIEF DESCRIPTION OF THE DRAWINGS

These and other features of the present disclosure will become more apparent upon reference to the drawings wherein like numerals refer to like parts throughout and wherein:

FIG. 3 is an enlarged perspective illustration of a portion of the composite article of FIG. 1 and illustrating the arrangement of the layers of fibers within the matrix and further illustrating side surfaces of each one of the fibers being oriented in non-perpendicular relation to upper and lower surface of the fibers;

FIG. 8 is a sectional illustration of an embodiment of a composite article having layers arranged such that the gaps between the side surfaces of the fibers in one layer are offset from the gaps between the side surfaces of the fibers of adjacent layers;

FIG. 8A is a partial sectional illustration of a composite article having fibers with non-planar side surfaces formed complementary to one another;

FIG. 9 is a sectional illustration of a further embodiment of a composite article including fibers having a triangular cross section and arranged in alternating upright and inverted orientations and further illustrating the side surfaces of the adjacent fibers overlapping one another when viewed along a direction perpendicular to a plane of a layer;

DETAILED DESCRIPTION

Figure 2:
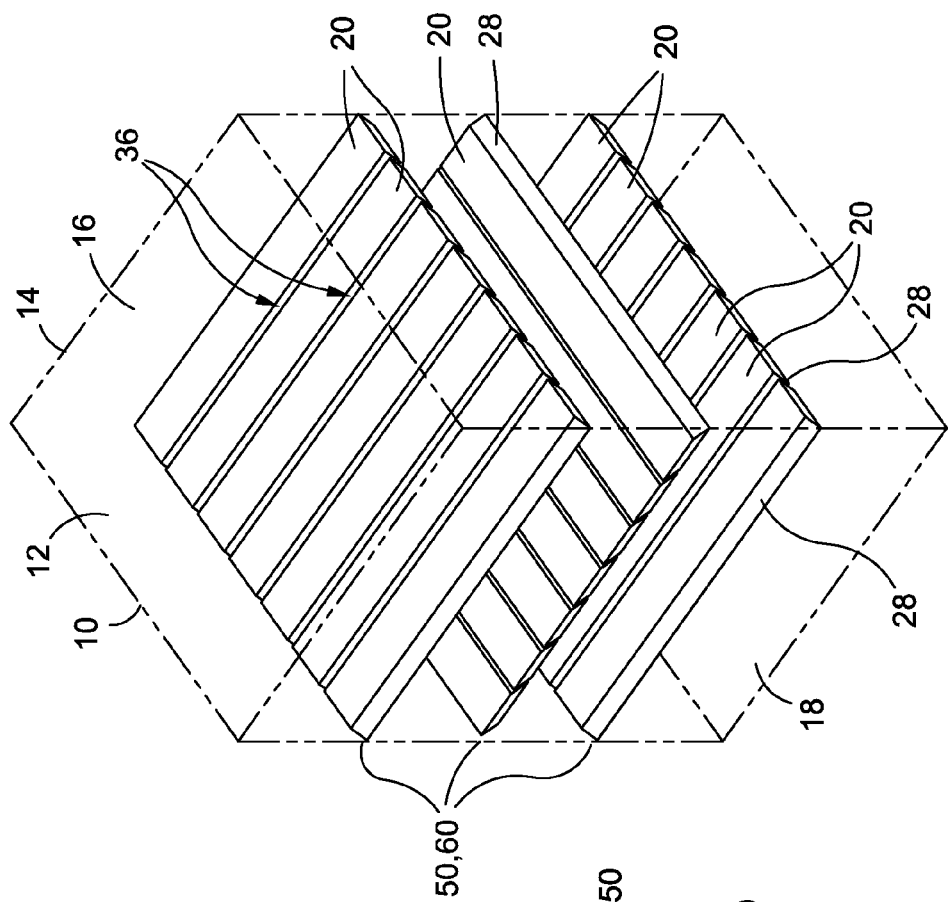
FIG. 2 is an exploded perspective illustration of the composite article of FIG. 1 and illustrating a plurality of layers of the fibers.
Figure 1:
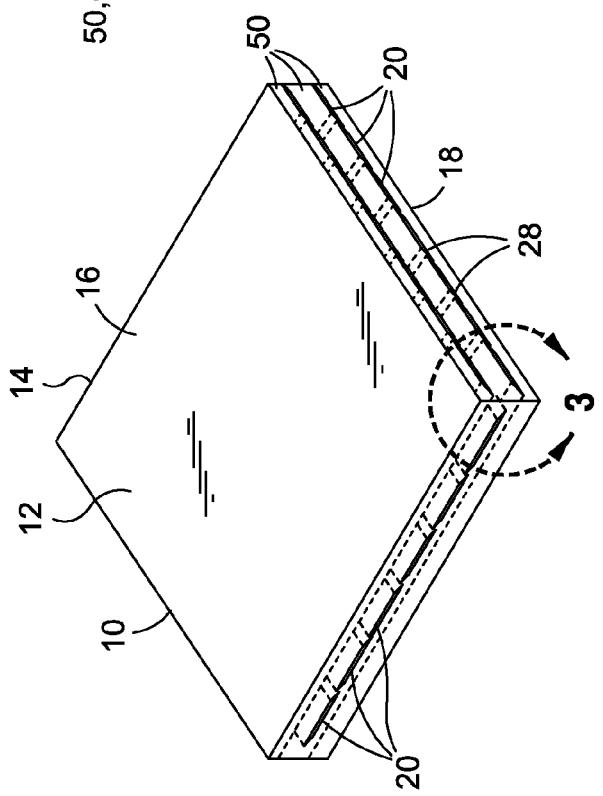
FIG. 1 is a perspective illustration of a composite article in an embodiment comprising a substantially optically transparent matrix and a plurality of substantially optically transparent fibers.

Referring now to the drawings wherein the showings are for purposes of illustrating preferred and various embodiments of the disclosure, shown in FIGS. 1 and 2 is an embodiment of a composite article 10. The composite article 10 may be fabricated as a fiber reinforced composite panel 14 comprising a matrix 18 and a plurality of fibers 20 (FIG. 2) embedded within the matrix 18. The composite article 10 may be fabricated as an optically transparent composite panel 14 such that the matrix 18 may comprise a substantially transparent polymeric matrix 18 and the fibers 20 may comprise substantially transparent fibers 20. Although illustrated in FIG. 1 in a panel 14 configuration having planar panel surfaces 16, the composite article 10 may be formed in any one of a wide variety of sizes, shapes and configurations, without limitation, and may include planar surfaces and/or compound curvature surfaces.

Figure 10C:
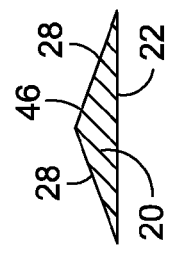
FIG. 10C is a cross-sectional illustration of a fiber having a triangular cross-sectional shape.
Figure 10D:
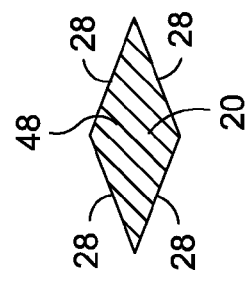
FIG. 10D is a cross-sectional illustration of the fiber having a diamond cross-sectional shape.

Advantageously, the composite article 10 as disclosed herein includes fibers 20 having optimized shapes to improve the optical performance of the composite article 10. More specifically, the fibers 20 of the composite article 10 include side surfaces 28 (FIG. 3) that are oriented in non-perpendicular relation to one or more base surfaces 22 (FIG. 3) of a fiber 20. In the context of the present disclosure, a base surface 22 of a fiber 20 comprises an upper and/or lower surface 24, 26 of the fiber 20. For example, referring briefly to FIGS. 10A-10B, the fiber 20 is illustrated as having a parallelogram 42 cross section (FIG. 10A) or a trapezoidal 44 cross section (FIG. 10B) formed by two base surfaces 22 and two side surfaces 28. The base surfaces 22 in FIG. 10A-10B comprise an upper surface 24 and a lower surface 26. FIG. 10C illustrates a triangular 46 cross section of the fiber 20 having a base surface 22 and a pair of side surfaces 28. FIG. 10D illustrates the fiber 20 in a further embodiment comprising a diamond 48 cross-sectional shape having only side surfaces 28 and not having a base surface 22. It should be noted that although the fibers 20 shown in FIGS. 10A-10D are illustrated with relatively sharp corners, the present disclosure contemplates fibers 20 of any configuration having corners that may be rounded, chamfered beveled or otherwise provided as non-sharp corners.

Referring to FIG. 2, shown is an exploded illustration of the composite article 10 illustrating a plurality of fibers 20 formed as strips and arranged in layers 50 within the matrix 18. In an embodiment, the fibers 20 may include one or more base surfaces 22 such as the upper and lower surfaces 24, 26 of the fibers 20 illustrated in FIG. 4. As shown in FIG. 2, the fibers 20 may be oriented within the matrix 18 such that the base surfaces 22 (e.g., upper and lower surfaces 24, 26) are substantially parallel to an article surface 12 of the composite article 10 which may improve the optical performance of the composite article 10.

Although the composite article 10 is illustrated as having three layers 50, any number may be provided. Furthermore, although FIG. 2 illustrates a cross-ply configuration 60 of the layers 50 wherein the fibers 20 in each layer 50 as being oriented perpendicularly relative to the fibers 20 of adjacent layers 50, the layers 50 may be arranged in a unidirectional configuration 58 as shown in FIG. 8 wherein the fibers 20 of one layer 50 may be oriented parallel to the fibers 20 of adjacent layers 50. Furthermore, the fibers 20 in a given layer 50 may be oriented at any angle (e.g., 15°, 22.5°, 45°, 60°, 75°, etc.) relative to the fibers 20 of adjacent layers 50.

Referring to FIG. 3, shown is an enlarged perspective illustration of a portion of the composite article 10 illustrating the arrangement of the fibers 20 within the matrix 18. As can be seen in FIG. 3, each one of the fibers 20 includes upper and lower surfaces 24, 26 and opposing side surfaces 28 forming a parallelogram 42 (FIG. 10A) cross section. However, the fibers 20 may be formed in alternative shapes and configurations including a triangular 46 configuration illustrated in FIGS. 9 and 10C having a base surface 22 and a pair of side surfaces 28 oriented in non-parallel relation to one another. In a further embodiment, the fiber 20 cross section may comprise a trapezoid 44 as illustrated in FIG. 10B, or a diamond 48 cross-sectional shape as illustrated in FIG. 10D and described in greater detail below. As may be appreciated, the fiber 20 may be provided in a wide variety of cross-sectional shapes and is not limited to that which is illustrated in the Figures. Preferably, the fibers 20 have side surfaces 28 that are oriented non-perpendicularly relative to the base surfaces 22 and/or non-perpendicularly to an article surface 12 of a composite article 10.

Figure 4:
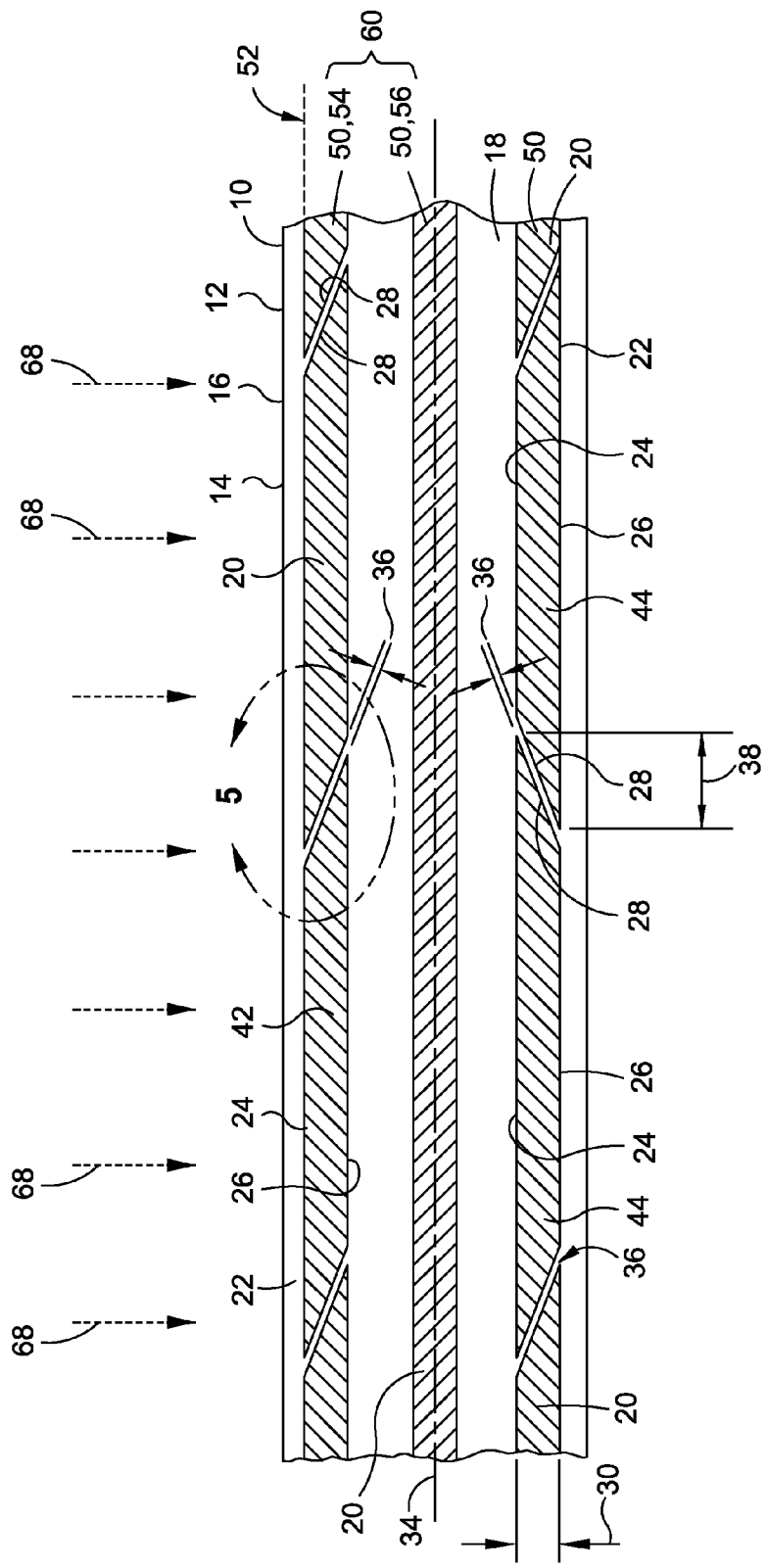
FIG. 4 is an enlarged sectional illustration of an embodiment of a composite article and illustrating the fibers having side surfaces oriented in non-perpendicular relation to upper and lower surfaces and wherein the side surfaces of each layer are placed in close proximity to the side surfaces of the immediately adjacent layers to minimize gaps between the side surfaces.

Referring to FIG. 4, shown is cross-sectional illustration of a composite article 10 including fibers 20 each having side surfaces 28 oriented in non-perpendicular relation to upper and lower surfaces 24, 26 (i.e., base surfaces 22) of the fiber 20. As shown, the fibers 20 of the composite article 10 may be mounted in side-by-side arrangement and in relatively close proximity to one another to minimize the gap 36 between the side surfaces 28 of adjacent fibers 20. By minimizing the gaps 36 between the side surfaces 28, distortion from phase differences 86 (FIG. 7) in light passing through the fibers 20 relative to the light passing between the fibers 20 is minimized. By orienting the side surfaces 28 in non-perpendicular relation to the base surfaces 22 of the fibers 20 and by positioning adjacent fibers 20 in close proximity to one another, optical distortions due to diffractive and refractive effects and phase difference 86 (FIG. 7) are minimized. Advantageously, optical distortions are minimized even when the refractive index of the fiber 20 and matrix 18 varies over a given temperature range. Furthermore, as a result of the orientation of the side surfaces 28 and the ability to position adjacent fibers 20 in close proximity to one another, the fiber 20 content of the composite article 10 may be increased relative to the fiber 20 content of conventional fiber-reinforced composites. The effect of the relatively close side-by-side spacing of the fibers 20 may include an increase in mechanical performance of the composite article 10 without a significant reduction in optical performance.

As can be seen in FIG. 4, the fibers 20 with side surfaces 28 may be oriented in non-perpendicular relation to the upper and lower surfaces 24, 26 of the fiber 20. The fibers 20 in each layer 50 are positioned in side-by-side arrangement to one another. In an embodiment, the fibers 20 may be positioned such that the gap 36 between adjacent side surfaces 28 is minimized. For example, the fibers 20 in a layer 50 may be positioned in side-by-side arrangement such that the side surfaces 28 overlap 38 when viewed along a direction substantially normal to a plane of the layer 52. In an embodiment, the adjacently disposed fibers 20 may be positioned in sufficiently close proximity to one another such that the gap 36 between the side surfaces 28 is less than the fiber thickness 30. The close spacing of the fibers 20 minimizes the amount the incident radiation 68 that may pass between the fibers 20 as described in greater detail below.

Referring again to FIG. 4, shown is the enlarged sectional illustration of the composite article 10 illustrating three layers 50 of fibers 20 wherein the fibers 20 of each layer 50 are positioned in side-by-side relation to one another and in a manner such that the side surfaces 28 of each fiber 20 are oriented substantially parallel to the side surfaces 28 of the immediately adjacent fibers 20. As indicated above, the fibers 20 are preferably positioned in side-by-side relationship such that a relatively small gap 36 is formed between the side surfaces 28 of adjacent fibers 20. The fibers 20 may be positioned such that the side surfaces 28 overlap 38 when viewed along a direction normal to a plane 52 defined by a layer 50 of the fibers 20.

The side surfaces 28 of each one of the fibers 20 may be oriented substantially parallel to one another to facilitate positioning of adjacent fibers 20 in close proximity to one another although non-parallel orientations of the side surfaces 28 are contemplated. In an embodiment, the side surfaces 28 of the fibers 20 may be oriented at an angle θ (FIG. 10A) of between approximately 10° to 170° relative to the upper and/or lower surfaces 24, 26 of the fibers 20. However, it is contemplated that the side surfaces 28 may be oriented at angles θ of less than 10° or greater than 170° relative to the upper and lower surfaces 24, 26. In addition, the angle θ of the side surfaces 28 and/or the angles θ of the side surfaces 28 of adjacently-disposed fibers 20 may be varied among the fibers 20 within a layer 50 and/or among the fibers 20 in different layers 50 or in different portions of the composite article 10 as a means to minimize reduced optical performance that may otherwise occur in conditions where light is oriented along a direction generally parallel to the angle θ of the side surfaces 28 and which may otherwise result in phase grating effects as described below.

The close proximity of the fibers 20 (FIG. 4) may minimize the amount of radiation (e.g., light) passing through the gap 36 (FIG. 4) between adjacent fibers 20. In addition, differences in the optical path lengths of light 72 (FIG. 5) passing through a given layer 50 (FIG. 4) can be minimized by minimizing the gap 36 between the fibers 20 of the layer 50. By minimizing the gap 36 between adjacent fibers 20, the optical path length 72 of light passing through the main portion (i.e., between the side surfaces 28) of each fiber 20 may be substantially similar to the optical path length 72 of light passing through one or more of the side surfaces 28 of the fibers 20 in a layer 50 which results in minimal optical distortion relative to fiber 20 arrangements of conventional composites.

Referring still to FIG. 4, shown are three layers 50 of fibers 20 wherein the uppermost layer 50 is comprised of fibers 20 formed in a parallelogram 42 cross section. Each one of the parallelogram 42 cross section fibers 20 has upper and lower surfaces 24, 26 and opposing side surfaces 28 oriented substantially parallel to one another. FIG. 4 also illustrates a lowermost layer 50 comprised of fibers 20 having a trapezoidal 44 cross section. Each trapezoidal 44 cross section includes upper and lower surfaces 24, 26 and side surfaces 28 that are oriented in non-parallel relation to one another. The trapezoidal 44 cross-sectional fibers 20 in the lowermost layer 50 of FIG. 4 may be arranged in alternating upright and inverted orientations such that the side surfaces 28 of adjacent fibers 20 are substantially parallel to one another.

Referring still to FIG. 4, the intermediate layer 50 between the uppermost layer 50 and lowermost layer 50 may be comprised of fibers 20 having cross-sectional shapes similar to that of the fibers 20 in the uppermost or lowermost layers 50 although the fibers 20 in the intermediate layer 50 may have a different cross-sectional shape. The intermediate layer 50 between the uppermost and lowermost layers 50 may also be oriented perpendicularly relative to the orientation of the fibers 20 in the uppermost layer 50 and lowermost layer 50 as shown wherein the fiber axis 34 extends along the plane 52 of the paper.

However, the intermediate layer 50 may be oriented perpendicularly relative to the orientation of the fibers 20 in the uppermost and lowermost layers 50. In addition, the fibers 20 in any of the layers 50 may be oriented substantially parallel to the article surfaces 12 of the composite article 10. For example, the upper and lower surfaces 24, 26 of the fibers 20 in FIG. 4 are illustrated as being oriented substantially parallel to the article surfaces 12. In addition, although the base surfaces 22 (e.g., upper and lower surfaces 24, 26) of the fibers 20 are preferably substantially planar as illustrated in FIG. 4, the upper and/or lower surfaces 24, 26 of one or more of the fibers 20 may be non-planar including slightly curved shapes of the upper and/or lower surfaces 24, 26. However, a substantially planar shape is believed to be preferable to minimize optical distortion.

Figure 5:
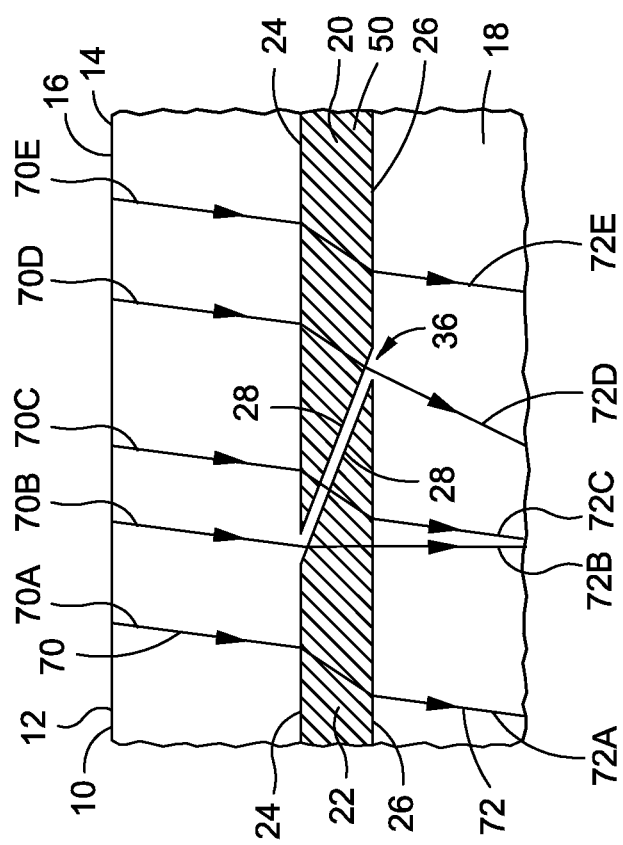
FIG. 5 is an enlarged partial sectional illustration taken along line 5 of FIG. 4 and illustrating a plurality of light rays passing through a composite article comprised of the matrix and fiber and illustrating minimal differences in the path lengths of the light passing through the main portion of the fibers relative to the light passing through the side surfaces of the fibers.

Referring to FIG. 5, shown is an enlarged sectional illustration of the composite article 10 and a pair of fibers 20 located in relatively close proximity to one another and further illustrating a plurality of light rays 70 passing through the composite article 10. It can be seen that the path lengths 72 of the light rays 70 differ depending on whether the light rays 70 pass through the main portion of the fiber 20 (i.e., between the side surfaces 28) or whether the light rays 70 pass through one or more of the side surfaces 28 of the fibers 20. For example, FIG. 5 illustrates a first light ray 70A which passes from the matrix 18 into the fiber 20 and then exits the fiber 20 and passes into the matrix 18 resulting in a change in direction of the first light ray 70A due to differences in refractive index of the matrix 18 relative to the refractive index of the fiber 20. Likewise, a fifth light ray 70E passes from the matrix 18 into the fiber 20 and then exits the fiber 20 such that the fifth path length 72E is substantially equivalent in length to the first path length 72A of the first light ray 70A.

FIG. 5 also illustrates a third light ray 70C which passes through the matrix 18 into a side surface 28 of one of the fibers 20 and then crosses the gap 36 and enters the side surface 28 of the adjacent fiber 20 prior to exiting the fiber 20 and entering the matrix 18 along a third path length 72C. Advantageously, by minimizing the gap 36 between the side surfaces 28, the difference in the third path length 72C relative to the first and fifth path lengths 72A, 72E is relatively small. The second and fourth light rays 70B, 70D are incident upon one of the side surfaces 28 of one of the fibers 20 resulting in longer optical paths relative to the first, third and fifth path lengths 72A, 72C, 72E. Although a difference in optical path length 72 generally results in optical distortion, in the arrangement of FIG. 5, the amount of light passing through the end portions may be kept relatively small by minimizing the width of the gaps 36 and the total quantity of gaps 36 in each layer 50 such that optical distortion is minimized.

Figure 6:
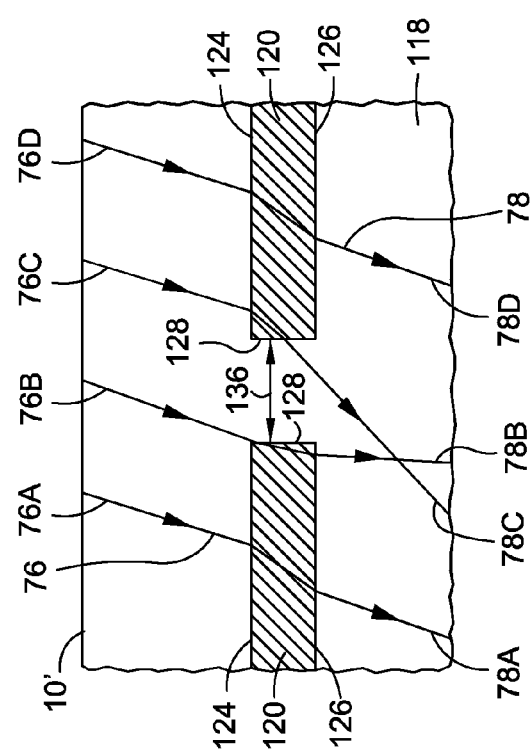
FIG. 6 is an enlarged illustration of a composite article having fibers with side surfaces oriented perpendicularly relative to the article surface and having a relatively wide gap between the side surface and illustrating light rays having different optical path length due to refractive effects on the light rays that pass through the side surfaces.

Referring to FIG. 6, shown is an arrangement of a composite article 10' wherein the side surfaces 128 of a pair of fibers 120 are oriented generally perpendicularly relative to the upper and lower surfaces 124, 126 of the fibers 120. The perpendicular orientation of the side surfaces 128 results in the side surfaces 128 of each one of the fibers 120 acting as a prism when viewed off-angle or along a direction non-parallel to the side surfaces 128. In this regard, FIG. 6 illustrates a plurality of light rays 76 passing through the composite article 10'. It can be seen in FIG. 6 that the optical path lengths 78 of the light rays 76 differ significantly depending on whether the light rays 76 pass through the main portion of the fiber 120 (i.e., between the side surfaces 128) or whether the light rays 76 pass through one or more of the side surfaces 128 of the fibers 120. For example, FIG. 6 illustrates a first and fourth light ray 76A, 76D passing from the matrix 118 into the fiber 120 at the upper surfaces 124 and then exiting the fiber 120 and passing back into the matrix 118 at the lower surfaces 126 resulting in a change in direction of the first and fourth light ray 76A, 76D due to differences in refractive index of the matrix 18 relative to the refractive index of the fiber 120.

FIG. 6 also illustrates a second light ray 76B entering one of the fibers 120 at a side surface 128 and then exiting the same fiber 120 at the lower surface 126 of the fiber 120 resulting in relatively small change in direction and a correspondingly small difference in a second path length 78B relative to the first and fourth path lengths 78A, 78D. However, FIG. 6 illustrates a third light ray 76C entering the fiber 120 at an upper surface 124 and then exiting the same fiber 120 at the side surface 128 resulting in a significant change in direction and a significant difference in a third path length 78C of the third light ray 76C relative to the first, second and fourth path lengths 78A, 78B, 78D. The net effect of the significantly large third path length 78C relative to the first, second and fourth path lengths 78A, 78B, 78D in FIG. 6 is a significant reduction in optical performance due to refractive and diffractive effects caused by the side surfaces 128 of the fibers 120.

Figure 7:
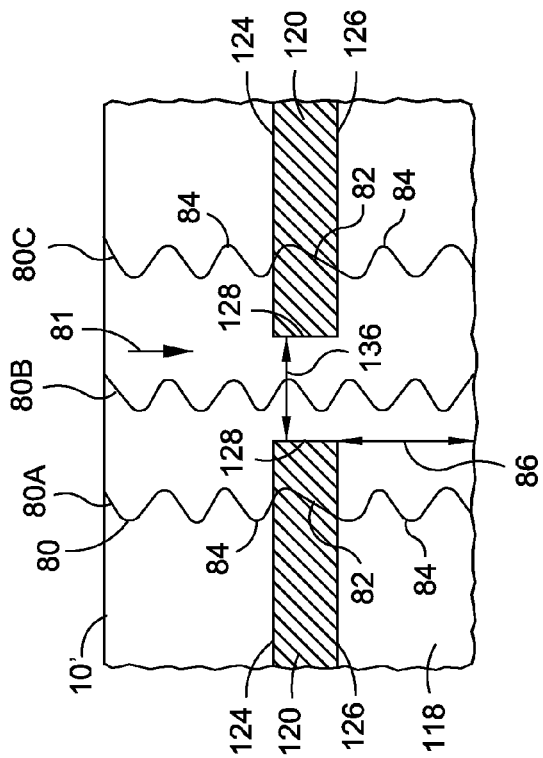
FIG. 7 is an enlarged illustration of the composite article similar to that which is illustrated in FIG. 6 and illustrating phase grating effects as a result of light rays passing between the fibers without going through the fibers resulting in phase differences with the light that passes through the fibers.

Referring to FIG. 7, shown is the arrangement of the composite article 10' similar to that which is illustrated in FIG. 6 wherein the side surfaces 128 in FIG. 7 are oriented perpendicularly and are spaced apart from one another result in a relatively large spacing or gap 136 between the side surfaces 128. The effect of the gap 136 between the side surfaces 128 is a reduction in optical performance due to phase grating effects. The phase grating effects reduce the optical performance of the composite article 10' as a result of a portion of the light rays 80 along direction 81 passing through the gap 136 and the remaining portion of the light rays 80 passing through both the matrix 118 and the fibers 120, each of which may have different indices of refraction. In this regard, the gap 136 allows the second light ray 80B to pass between the side surfaces 128 without passing through the fibers 120 which have a different index of refraction relative to the index of refraction of the matrix 118.

As known in the art, index of refraction or refractive index, represented by $n(\lambda,T)$, is a function of the wavelength $\lambda$ of radiation incident 68 on a material at temperature T. The refractive index of a given material at a given temperature T may be defined as the ratio of the speed of light at a given wavelength $\lambda$ in a vacuum to the speed of light at the same wavelength $\lambda$ in the given material at the temperature T. Although the fibers 120 and matrix 118 may be selected of material having the same refractive index at a given match point temperature for a given wavelength, the refractive indices of the respective materials may change or diverge from one another as the temperature changes (i.e., increases or decreases) from the match point temperature.

As a result, in FIG. 7, the wavelength 82 of light passing through the fibers 120 will be different than the wavelength 84 of light passing through the matrix 118. As can be seen in FIG. 7, the phases of the first and third light rays 80A, 80C change as the first and third light rays 80A, 80C pass from the matrix 118 into the fiber 120 and then change again as the first and third light rays 80A, 80C pass from the fiber 120 back into the matrix 118. However, the phase of the second light ray 80B passes between the fibers 120 and does not pass through the fibers 120 and therefore maintains the same phase. As a result, the phase of the second light ray 80B is different than the phase of the first and third light rays 80A, 80C which results in significant optical distortion in the composite article 10.

In contrast, FIG. 5 illustrates the advantageous embodiment of the fibers 20 as disclosed herein wherein the fibers 20 have angled side surfaces 28 that overlap 38 (FIG. 4) one another such that phase differences 86 (FIG. 7) in the light rays 70 passing through the fibers 20 (i.e., phase grating effects) are minimized. Furthermore, the non-perpendicular orientation of the side surfaces 28 coupled with the close proximity of the side surfaces 28 results in minimal differences in the distance that each first light ray 70A travels through the fiber 20 material relative to the distance that each light ray 70 travels through the matrix 18. The minimal differences in the optical path lengths 72 of the light rays 70 in FIG. 5 result in minimal optical distortion from refractive or diffractive effects. Advantageously, the configuration of fibers 20 as disclosed herein also minimizes optical distortion despite differences in refractive index between the fibers 20 and the matrix 18 wherein the magnitude of the differences in refractive index of the fibers 20 and the matrix 18 may increase with changes in temperature of the composite article 10.

In an embodiment, the composite article 10 as disclosed herein may include fibers 20 having a refractive index that is substantially equivalent to the matrix 18 refractive index within a wavelength band of interest. More specifically, the matrix 18 and the fibers 20 preferably have complementary or substantially equivalent refractive indices within a broad temperature range for a wavelength band of interest. The wavelength band of interest may include the visible spectrum and/or alternatively include the infrared spectrum or any other wavelength band. In an embodiment, the refractive indices of the matrix 18 and the fibers 20 are preferably substantially equivalent or closely matched within the wavelength band of interest for a given temperature range in order to minimize or reduce bending of light at the interface of the matrix 18 and the fibers 20.

Referring still to FIG. 5, the matrix 18 and the fibers 20 may also be selected to have substantially equivalent temperature coefficients of refractive index $dn(\lambda,T)/dT$ wherein $dn(\lambda,T)/dT$ is the partial derivative of index of refraction $n(\lambda,T)$ with respect to temperature T. The temperature coefficient of refractive index $dn(\lambda,T)/dT$ of a material may be defined as the change in refractive index for the material for a given wavelength with change in temperature of the material. In the present disclosure, the matrix 18 and fibers 20 preferably have substantially equivalent refractive indices within a broad temperature range for a wavelength band of interest such that the respective temperature coefficients of refractive index are also substantially equivalent. In an embodiment, the refractive indices and the temperature coefficients of refractive index of the matrix 18 and the fibers 20 are preferably such that the refractive indices of the matrix 18 and the fibers 20 are equivalent at a given wavelength within the wavelength band of interest for at least one temperature within a temperature range.

Referring now to FIG. 8, shown is a sectional illustration of a composite article 10 including fibers 20 having a parallelogram 42 cross section wherein the side surfaces 28 are substantially parallel to one another. The composite article 10 includes a pair of layers 50 including a first layer 54 and a second layer 56 each having fibers 20 arranged in side-by-side relation to one another. As can be seen in FIG. 8, the fibers 20 are positioned such that the side surfaces 28 of each fiber 20 are oriented substantially parallel to the side surfaces 28 of the immediately adjacent fibers 20. The first layer 54 is positioned relative to the second layer 56 such that the gaps 36 in the side surfaces 28 of the fibers 20 of the first layer 54 are offset 40 from the gaps 36 in the side surfaces 28 of the fibers 20 of the second layer 56 when viewed along a direction substantially normal to the plane 52 of at least one of the first and second layers 54, 56. By staggering or offsetting 40 the gaps 36 of one layer 50 relative to other layers 50, optical distortion is spread throughout the composite article 10 thereby minimizing optical distortion at any single point within the composite article 10.

Referring to FIG. 8A, shown is a partial sectional illustration of a pair of adjacently disposed fibers 20 having side surfaces 28 formed in non-planar configurations. In an embodiment, the side surfaces 28 may be formed as a pair of mating curved surfaces as illustrated in FIG. 8A. As shown, the side surfaces 28 may be slightly curved and may be formed complementary to one another such as in a mating configuration 29. In the non-limiting example of FIG. 8A, the side surfaces 28 are formed in a mating configuration 29 wherein one of the side surfaces 28 has a concave shape and the adjacent one of the side surfaces 28 has a convex shape that is sized and configured complementary to the concave shape. Although FIG. 8A illustrates fibers 20 having non-planar side surfaces 28 being formed with a single curvature, the side surfaces 28 may be provided in complex curvatures and are not limited to the mating configuration 29 shown. In an embodiment, fibers 20 with non-planar side surfaces 28 may be positioned in relatively close proximity to one another such that line of sight between the non-planar side surfaces 28 is prevented. In this manner, phase grating effects as illustrated in FIG. 7 may be significantly reduced or eliminated for the fiber 20 configuration illustrated in FIG. 8A due to light rays (not shown) that may enter between the gap 36 (FIG. 8) at the upper or lower surface 24, 26 of the fibers 20 necessarily passing through at least a portion of the fiber 20 side surfaces 28 as opposed to the embodiment illustrated in FIG. 7 wherein light rays 80 (FIG. 7) may pass between the fibers 120 (FIG. 7) without passing through the fibers 120 resulting in phase differences with the light that passes through the fibers 120 as described above.

Referring to FIG. 9, shown is an embodiment of the composite article 10 wherein the fibers 20 have a triangular 46 cross-sectional shape. The triangular 46 fibers 20 in a given layer 50 may be arranged in alternating upright and inverted orientations such that the side surfaces 28 of adjacent fibers 20 are substantially parallel to one another. Each one of the triangular 46 cross-sectional fibers 20 in FIG. 9 has side surfaces 28 that are of equal length and which are oriented at equal angles relative to one forming an isosceles triangle. However, the triangular 46 cross-sectional fibers 20 illustrated in FIG. 9 may be provided in a variety of different arrangements and are not limited to having substantially equivalent angles of the side surfaces 28.

As shown in FIG. 9, the fibers 20 are oriented such that gaps 36 between the side surfaces 28 are minimized as a result of the overlap 38 of the side surfaces 28. FIG. 9 illustrates an arrangement of the layers 50 where the first and second layers 54, 56 represent a cross-ply configuration 60 wherein the fibers 20 of one layer 50 are oriented perpendicularly to the fiber axis 34 or fibers 20 of the adjacent layer 50. However, the layers 50 may be arranged in any orientation relative to one another including a unidirectional configuration 58 wherein the fibers 20 of a given layer 50 are substantially parallel to the fibers 20 of an adjacent layer 50.

Figure 10A:
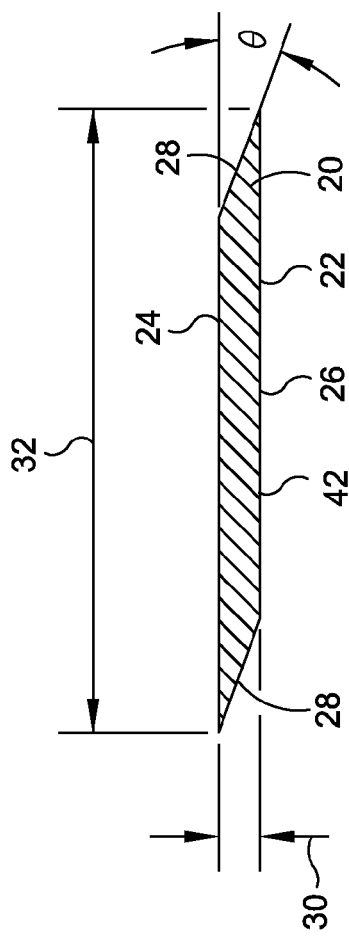
FIG. 10A is a cross-sectional illustration of a fiber having a parallelogram cross-sectional shape.
Figure 10B:
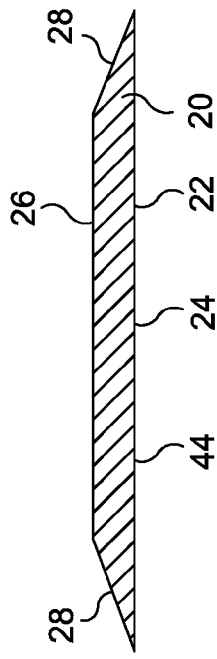
FIG. 10B is a cross-sectional illustration of a fiber having a trapezoidal cross-sectional shape.

Referring to FIGS. 10A-10D, shown are different cross-sectional configurations of non-limiting embodiments of the fibers 20. FIG. 10A illustrates the parallelogram 42 cross section of the fiber 20 having upper and lower surfaces 24, 26 and substantially parallel side surfaces 28. As can be seen in FIG. 10A, the fiber 20 has a generally elongated cross-sectional shape which is preferably formed with a relatively high aspect ratio to minimize the quantity of gaps 36 (FIG. 4) in a layer 50 (FIG. 4). The aspect ratio of a fiber 20 may be defined as the ratio of fiber width 32 to fiber thickness 30. In an embodiment, the aspect ratio may vary from approximately 3 to approximately 500 although the fiber 20 cross section may have any aspect ratio of any value.

The fiber thickness 30 may be in the range of from approximately 5 microns to approximately 5,000 microns (0.0002 to 0.20 inch). However, the fiber 20 may be provided in any fiber thickness 30, without limitation. As shown in FIG. 10A, the side surfaces 28 are formed at an angle θ which may be in the range of from approximately 10° to approximately 170° relative to the upper and/or lower surfaces 24, 26 of the fiber 20 although larger or smaller angles are contemplated. Although FIG. 10A illustrates the upper and lower surfaces 24, 26 as being substantially planar, the upper and lower surfaces 24, 26 may be slightly curved including slightly concave, slightly convex or crowned and are not limited to a strictly substantially planar or flat profile.

Referring to FIG. 10B, shown is a further embodiment of a fiber 20 illustrated in the trapezoidal 44 cross section and having substantially planar upper and lower surfaces 24, 26 being substantially parallel to one another. The side surfaces 28 are illustrated as being oriented in non-parallel relation to one another. The side surfaces 28 may be oriented at substantially equal angles relative to the upper and lower surfaces 24, 26 but may extend in different directions. The trapezoidal 44 cross section of the fiber 20 in FIG. 10B may be provided with a relatively high aspect ratio similar to that described above for the parallelogram 42 cross sectional fiber 20 of FIG. 10A and which may result in improved optical performance for the composite article 10.

Referring to FIG. 10C, shown is an embodiment of a fiber 20 in the triangular 46 cross section having a base surface 22 and a pair of side surfaces 28 oriented in non-parallel relation to one another as described above. A layer 50 of triangular 46 cross-sectional fibers 20 may be arranged in side-by-side arrangement as shown in FIG. 9 in a manner to minimize the gap 36 between the side surfaces 28 of adjacent fibers 20. The aspect ratio of the triangular 46 cross-sectional fiber 20 is preferably large to minimize distortion. Advantageously, the triangular 46 cross section of the fiber 20 may facilitate registration or alignment of the fibers 20 relative to one another when laying up the composite article 10. For example, a row of the triangular 46 cross-sectional fibers 20 may be arranged in an upright orientation and in side-by-side arrangement to one another similar to that which is illustrated in FIG. 9. Following the laying up of the row of upright triangular 46 cross-sectional fibers 20, a row of inverted triangular 46 cross-sectional fibers 20 may then be nested between the triangular 46 cross-sectional fibers 20 to form a layer 50 of fibers 20 similar to that illustrated in FIG. 9.

Referring to FIG. 10D, shown is a fiber 20 in a further embodiment comprising a diamond 48 cross-sectional shape. As can be seen in FIG. 10D, the diamond 48 cross-sectional shape fiber 20 may include two pairs of the side surfaces 28 in contrast to the single pair of side surfaces 28 for the fibers 20 illustrated in FIGS. 10A-10C. The diamond 48 cross-sectional shape fiber 20 illustrated in FIG. 10D may be arranged in layers 50 (FIG. 9) by orienting each one of the fibers 20 such that the side surfaces 28 are oriented non-parallel to the article surface 12 of the composite article 10.

Advantageously, in each one of the fiber 20 embodiments, the non-perpendicular orientation of the side surfaces 28 relative to the upper and lower surfaces 24, 26 or base surfaces 22 facilitates increased fiber 20 volume in the composite article 10 relative to fiber 20 volumes of fibers 20 having rounded side surfaces 28. In an embodiment, the composite article 10 may be configured such that the total volume of fibers 20 relative to the total volume of the composite article 10 may be in the range of from approximately 10% up to approximately 90% or more. However, the volume of fibers 20 may comprise any portion of the total volume of the composite article 10. The desired fiber 20 volume may be selected based up on a variety of parameters including, but not limited to, optical performance, strength, ballistic performance, stiffness, weight and a variety of other factors.

The matrix 18 and the fibers 20 (FIGS. 1-5 and 8-9) may be formed of any suitable material including, but not limited to, thermoplastics, thermosets, ceramics, and glass. Both the fibers 20 and the matrix 18 are preferably formed of materials that are substantially optically transparent although the materials may comprise opaque materials. In this regard, the fibers 20 and the matrix 18 may be formed of material having any level of transparency ranging from substantially transparent to substantially opaque. Thermoplastic materials from which the matrix 18 and the fibers 20 may be formed may include at least one of the following: acrylics, fluorocarbons, polyamides, polyethylenes, polyesters, polypropylenes, polycarbonates, polyurethanes, polyetheretherketone, polyetherketoneketone, and polyetherimides. The matrix 18 and fibers 20 may also be formed of thermoset materials which may comprise at least one of the following: polyurethanes, phenolics, polyimides, bismaleimides, polyesters, epoxies, and silsesquioxanes. In addition, the matrix 18 and/or fibers 20 may be formed of inorganic materials including, but not limited to, carbons, silicon carbide and boron. The matrix 18 and the fiber fibers 20 may also be formed of glass compositions which may include, without limitation, E-glass (aluminoborosilicate glass), S-glass (alumino silicate glass), pure silica, borosilicate glass, optical glass, ceramics, and glass-ceramics such as ROBAX™ glass-ceramic material.

The composite article 10 (FIGS. 1-5 and 8-9) may be configured in any one of a variety of configurations including the panel 14 configuration illustrated in FIG. 1 or other configurations including, but not limited to, a transparency for a vehicle such as a windshield, a canopy or window of an aircraft. In addition, the composite article 10 may be configured for use in alternative vehicular applications as well as non-vehicular applications. For example, the composite article 10 may be configured as a structural panel or an architectural panel for a building. The composite article 10 may be configured for use in structural or non-structural applications. In this regard, the composite article 10 may be configured for use in any application, system, subsystem, structure, apparatus and/or device, without limitation.

Figure 11:
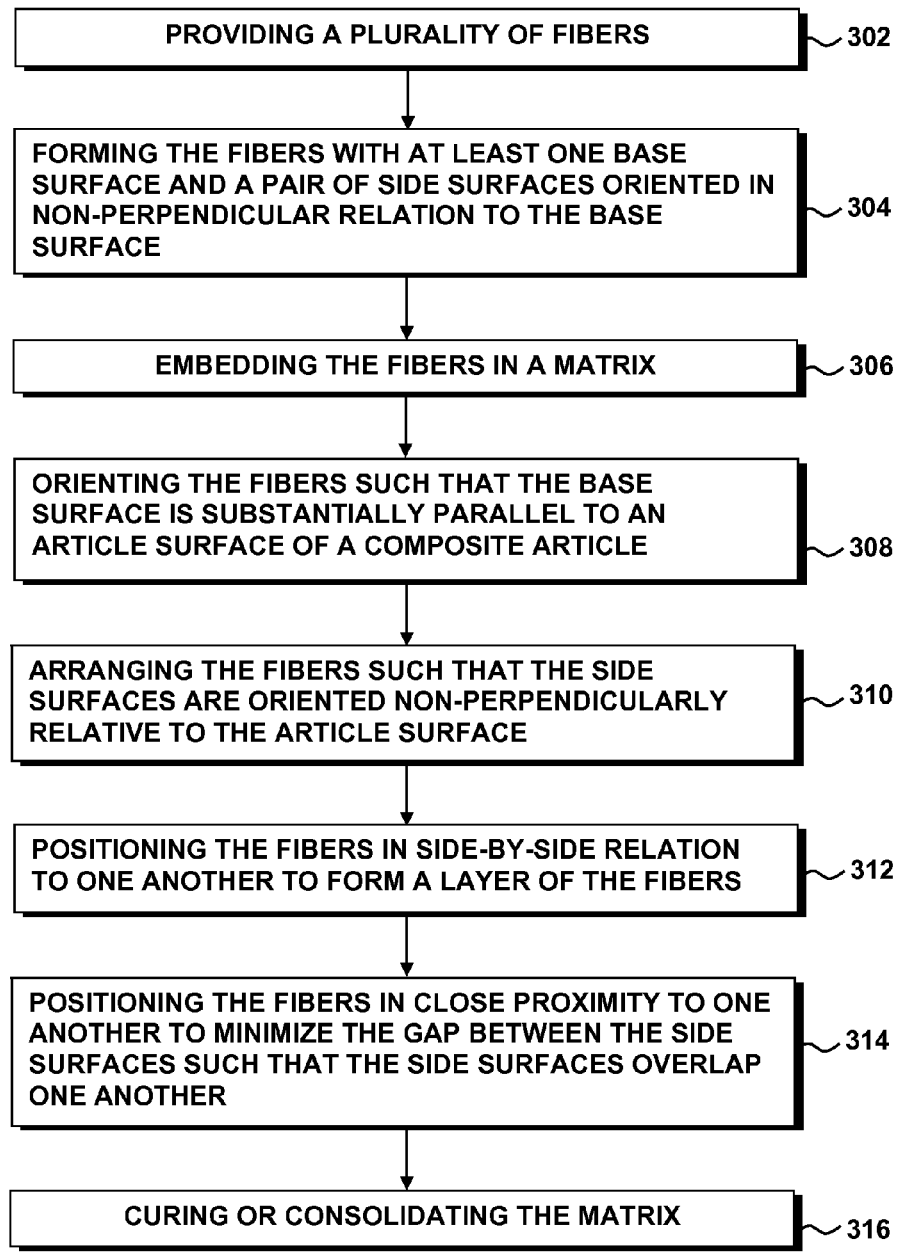
FIG. 11 is an illustration of a flow chart including one or more operations that may be included in a methodology of manufacturing a composite article.

Referring to FIG. 11, shown is a flow chart illustrating one or more operations that may be included in a methodology for manufacturing a composite article 10 (FIGS. 1-5 and 8-9). Step 302 of the methodology may include providing a plurality of fibers 20 (FIG. 2). As indicated above, the fibers 20 may be provided in any one of a variety of substantially optically transparent materials. The fiber 20 material may be selected to have a substantially equal temperature coefficient of refractive index as the matrix 18 (FIGS. 1-5 and 8-9) in order to minimize optical distortion as the temperature of the composite article 10 changes.

Step 304 of the methodology of FIG. 11 may include forming the fibers 20 with at least one base surface 22 (FIG. 4) and a pair of side surfaces 28 (FIG. 4) oriented non-perpendicularly relative to the base surface 22. The fibers 20 may be oriented in any one of a variety of alternative cross-sectional shapes including, but not limited to, those which are illustrated in FIGS. 10A-10D. The cross-sectional shapes may include the base surface 22 such as the upper and lower surfaces 24, 26. Each one of the fiber 20 configurations also includes at least one pair of the side surfaces 28 which are oriented in non-perpendicular relation to the base surface 22 as illustrated in FIGS. 10A-10C. The side surfaces 28 may be oriented at an angle θ (FIG. 10A) of between approximately 10° and 170° relative to the base surface 22 and/or relative to the upper and lower surfaces 24, 26 although larger or smaller angles are contemplated.

Step 306 of the methodology of FIG. 11 may include embedding the fibers 20 in a matrix 18. The matrix 18 may preferably comprise a substantially optically transparent material similar to that which was described above. Furthermore, the matrix 18 material is preferably of a substantially equivalent temperature coefficient of refractive index to that of the fibers 20 as indicated above.

Step 308 of FIG. 11 may include orienting the fibers 20 such that the base surface 22 and/or the upper and lower surfaces 24, 26 are substantially parallel to the article surface 12 of the composite article 10. For example, FIG. 4 illustrates the arrangement of the fibers 20 in substantially parallel orientation to the article surface 12. Likewise, FIG. 9 illustrates a plurality of triangular 46 cross-sectional shaped fibers 20 having base surfaces 22 which may each be oriented substantially parallel to a substantially planar article surface 12.

Step 310 of the methodology of FIG. 11 may include arranging the fibers 20 such that the side surfaces 28 are oriented non-perpendicularly relative to the article surface 12. For example, FIGS. 4, 8 and 9 illustrate the fibers 20 arranged in side-by-side relation to one another such that the gap 36 between the side surfaces 28 is oriented in non-perpendicular relation to the article surface 12. By orienting the side surfaces 28 at an angle (i.e., non-perpendicularly) relative to the article surface 12, the amount of light passing between the side surfaces 28 is minimized.

Step 312 of the methodology of FIG. 11 may comprise positioning the fibers 20 in side-by-side relation to one another to form a layer 50 of the fibers 20. The fibers 20 are preferably positioned such that the side surfaces 28 of each fiber 20 are substantially parallel to the side surfaces 28 of the immediately adjacent fibers 20 as illustrated in FIGS. 4, 8 and 9. Such an arrangement will reduce optical distortion and thereby improve the optical performance of the composite article 10.

Step 314 of FIG. 11 may include positioning the fibers 20 in close proximity to one another to minimize the gap 36 between the side surfaces 28. The side surfaces 28 preferably overlap 38 (FIG. 4) one another when viewed along a direction substantially normal to a plane of the layers 52 (FIG. 4). As shown in FIG. 5, the fibers 20 are positioned in close proximity to one another to minimize the width of the gap 36 between the side surfaces 28 and provide an arrangement where the length of the optical paths of light passing through the main portion of the fibers 20 is substantially equivalent to the length of the optical paths passing through one or more of the side surfaces 28 of the fibers 20. In this manner, phase differences 86 (FIG. 7) are minimized and such that optical distortion is minimized.

Step 316 of the methodology of FIG. 11 may comprise curing or consolidating the matrix 18 material and/or the fibers 20 material in order to reduce the composite article 10 (FIGS. 1-5 and 8-9). Heat and/or pressure may be applied to the composite article 10 for curing the matrix 18 and/or the fibers 20. In addition, any one of a variety of intermediate steps including debulking and degassing may be performed prior to curing or consolidating the matrix 18 and/or fiber 20 material.

Additional modifications and improvements of the present disclosure may be apparent to those of ordinary skill in the art. Thus, the particular combination of parts described and illustrated herein is intended to represent only certain embodiments of the present disclosure and is not intended to serve as limitations of alternative embodiments or devices within the spirit and scope of the disclosure.

What is claimed is:

1. A method of manufacturing a composite article, comprising the steps of:
    providing a plurality of fibers, at least a portion of the plurality of fibers being optically transparent;
    forming the fibers with at least one base surface and a pair of side surfaces oriented in non-perpendicular relation to the base surface;
    positioning the fibers in a layer in side-by-side relation to one another such that the side surfaces overlap one another when viewed along a direction normal to a plane of the layer; and
    embedding the fibers at least partially in an optically transparent polymeric matrix.

2. The method of claim 1 further comprising the step of:
    orienting the fibers such that the base surface is substantially parallel to an article surface of the composite article.

3. The method of claim 1 further comprising the step of:
    positioning the fibers in the layer such that the side surfaces of the fibers are substantially parallel to side surfaces of immediately adjacent fibers.

4. The method of claim 1 wherein:
    the side surfaces of an adjacent pair of fibers are non-planar; and
    the fibers being positioned such that line of sight through a gap between the side surfaces is prevented.

5. The method of claim 1 wherein:
    the side surfaces of an adjacent pair of fibers have mating curved surfaces.

6. The method of claim 1 wherein:
    the plurality of fibers are arranged in a first layer and a second layer; and
    the first layer being positioned relative to the second layer such that gaps between the side surfaces of the fibers of the first layer are offset from the gaps between the side surfaces of the fibers of the second layer.

7. The method of claim 1 wherein:
    the fibers have a triangular cross sectional shape.

8. The method of claim 1 wherein:
    the base surface comprises an opposing pair of upper and lower surfaces; and
    the side surfaces of at least a portion of the fibers are substantially parallel to one another.

9. The method of claim 1 wherein:
    the base surface comprises an opposing pair of upper and lower surfaces; and
    the side surfaces of at least a portion of the fibers are oriented in non-parallel relation to one another.

10. The method of claim 1 wherein:
    the fibers have an elongated cross section with an aspect ratio of fiber width to fiber thickness; and
    the aspect ratio being in a range of from approximately 3 to approximately 500.

11. The method of claim 10 wherein:
    the fiber thickness is in a range of from approximately 5 microns to approximately 5000 microns.

12. The method of claim 1 wherein:
    the fiber having a refractive index that is substantially equivalent to a matrix refractive index within a wavelength band of interest.

13. The method of claim 12 wherein:
    the matrix and the fiber have substantially equivalent temperature coefficients of refractive index.

14. The method of claim 1 wherein at least one of the matrix and the fiber is formed from at least one of the following materials:
- a thermoplastic material comprising at least one of the following: acrylics, fluorocarbons, polyamides, polyethylenes, polyesters, polypropylenes, polycarbonates, polyurethanes, polyetheretherketone, polyetherketoneketone, polyetherimides;
- a thermoset comprising at least one of the following: polyurethanes, phenolics, polyimides, bismaleimides, polyesters, epoxies, silsesquioxanes;
- inorganic material comprising at least one of the following: carbons, silicon carbide, boron; and
- glass comprising E-glass (alumino-borosilicate glass), S-glass (alumino silicate glass), pure silica, borosilicate glass, optical glass, ceramics, glass ceramics.

15. A method of manufacturing a composite article, comprising the steps of:
- providing a plurality of fibers, at least a portion of the plurality of fibers being optically transparent;
- forming at least a portion of the fibers with an opposing pair of substantially parallel upper and lower surfaces and a pair of side surfaces oriented in non-perpendicular relation to at least one of the upper and lower surfaces;
- positioning the fibers in a layer in side-by-side relation to one another such that the side surfaces overlap one another when viewed along a direction normal to a plane of the layer and such that a gap between the side surfaces is less than a fiber thickness; and
- embedding the fibers at least partially in an optically transparent polymeric matrix.

\* \* \* \* \*